(12) United States Patent
McOwan et al.

(10) Patent No.: US 7,869,634 B2
(45) Date of Patent: Jan. 11, 2011

(54) AUTHENTICATION OF SIGNATURES USING NORMALIZATION OF SIGNATURE DATA

(76) Inventors: Peter William McOwan, Queen Mary University of London, Mile End Road, London E1 4NS (GB); Ross Alec Joseph Everitt, 506 Green Lane, Seven Kings, Ilford, Essex IG3 9LH (GB)

( * ) Notice: Subject to any disclaimer, the term of this patent is extended or adjusted under 35 U.S.C. 154(b) by 617 days.

(21) Appl. No.: 10/500,854

(22) PCT Filed: Jan. 15, 2003

(86) PCT No.: PCT/GB03/00125
§ 371 (c)(1),
(2), (4) Date: Mar. 24, 2005

(87) PCT Pub. No.: WO03/063093
PCT Pub. Date: Jul. 31, 2003

(65) Prior Publication Data
US 2005/0223234 A1    Oct. 6, 2005

(30) Foreign Application Priority Data
Jan. 19, 2002  (GB) ................................ 0201232.6

(51) Int. Cl.
*G06K 9/00* (2006.01)
(52) U.S. Cl. ..................................... 382/119
(58) Field of Classification Search ................. 382/119, 382/123
See application file for complete search history.

(56) References Cited
U.S. PATENT DOCUMENTS
4,805,222 A * 2/1989 Young et al. ................. 382/115

(Continued)

FOREIGN PATENT DOCUMENTS
EP    0 827 329 A1    3/1998

(Continued)

OTHER PUBLICATIONS

Tangent Space Representation, http://knight.cix.temple.edu/~shape/shape/tangent_space.html, Aug. 13, 2009, 3 pgs.

(Continued)

*Primary Examiner*—Brian Q Le
*Assistant Examiner*—Edward Park
(74) *Attorney, Agent, or Firm*—Turocy & Watson, LLP

(57) ABSTRACT

An authentication system is provided for authenticating a user's signature as electronically inputted into the system by a mouse or other manual input device providing an output indicative of its location when manipulated by the user. The system serves to extract angle and distance data relating different parts of the user's signature inputted into the system, and to store corresponding angle and distance data relating to a reference signature as previously inputted into the system during a training procedure. The extracted data is then compared by the system to the reference data stored by the system, and, where appropriate an output indicative of an appropriate match between the inputted signature and the reference signature is provided in dependence on the result of the comparison. Such a system provides an on-line dynamic biometric verification system that can be customised to multiple Internet based applications requiring secure authentication. The system requires no specialised equipment at the point of use, allowing access from any Internet capable computer with a mouse and Java compliant browser for example.

49 Claims, 4 Drawing Sheets

U.S. PATENT DOCUMENTS

| | | | | |
|---|---|---|---|---|
| 5,042,073 | A | * | 8/1991 | Collot et al. ................ 382/123 |
| 5,101,437 | A | * | 3/1992 | Plamondon ................ 382/122 |
| 5,553,156 | A | * | 9/1996 | Obata et al. ................ 382/119 |
| 5,680,470 | A | * | 10/1997 | Moussa et al. ............. 382/119 |
| 6,111,976 | A | | 8/2000 | Rylander |
| 6,157,731 | A | * | 12/2000 | Hu et al. ..................... 382/119 |
| 6,208,756 | B1 | | 3/2001 | Suzuki |
| 2006/0050962 | A1 | * | 3/2006 | Geiger et al. ............... 382/186 |

FOREIGN PATENT DOCUMENTS

| | | |
|---|---|---|
| EP | 0 889 433 A2 | 1/1999 |
| FR | 2 684 469 | 11/1991 |
| GB | 2 104 698 A | 3/1983 |
| WO | WO 03/063093 | 7/2003 |

OTHER PUBLICATIONS

PCT International Preliminary Examination Report dated May 14, 2004, in corresponding International Application No. PCT/GB03/00125.

PCT International Search Report mailed Dec. 17, 2003, in corresponding International Application No. PCT/GB03/00125.

* cited by examiner

AUTHENTICATION OF SIGNATURES USING NORMALIZATION OF SIGNATURE DATA

CROSS-REFERENCE TO RELATED APPLICATION

This application is a National Stage entry of International Application No. PCT/GB03/000125, filed Jan. 15, 2003, the entire specification claims and drawings of which are incorporated herewith by reference.

This invention relates to authentication systems.

With the increasing usage of the internet as a business and social tool it is becoming more important that secure access to sensitive and personal information can be provided. Biometrics, the application of statistical analysis to identify an individual through their biological or physiological characteristics, is emerging as a key aspect in new security systems. Using biometrics it is possible to avoid pitfalls encountered by traditional security systems where users are required to keep a piece of information, such as a password, safe.

There are two types of biometric verification systems, classified by the type of biometric used; static or dynamic. Static biometric systems remain stable over time (barring injury), and examples of such biometric systems include fingerprinting systems, iris and retinal scan systems and hand geometry measurement systems. Dynamic biometric systems are subject to change over time, and examples of such biometric systems include signature systems, voice print systems and typing style systems. However such systems generally require specialised equipment at the point of use, thus rendering such systems unsuitable for multiple Internet based applications requiring secure authentication.

It is an object of the invention to provide an authentication system which is particularly suitable for multiple Internet based applications, as well as for a wide variety of other applications.

According to the present invention there is provided an authentication system for authenticating a user's signature as electronically inputted into the system by a manual input device providing an output indicative of its location with respect to time when manipulated by the user, the system comprising:

(a) extraction means for extracting angle and distance data relating different parts of the user's signature inputted into the system by the input device;

(b) registration means for setting up a reference data file compiled from angle and distance data relating to a plurality of samples of the user's signature inputted into the system by the user by means of the manual input device during a registration phase;

(c) comparison means for comparing the angle and distance data extracted by the extraction means from the user's signature inputted into the system during an authentication phase to reference angle and distance data held in the reference data file, according to defined verification criteria; and (d) verification means for providing an output indicative of an appropriate match between the inputted signature to be authenticated and the reference data in dependence on the result of the comparison, thereby providing verification of the user's signature.

Such a system can provide an on-line dynamic biometric verification system that can be customised to multiple Internet based applications requiring secure authentication. The system requires no specialised equipment at the point of use, allowing access from any Internet capable computer with a mouse and Java compliant, browser for example.

In this context it should be appreciated that the term "signature" is used in this specification to denote an electronic representation of an actual signature (the actual signature consisting of a distinctive representation of the user's name or any other distinctive pattern or representation, such as an emblem, mark or pictogram produced by the user), this electronic representation comprising in practice electronic data constituting an abstraction of the actual signature, for example by incorporating extracted angle and distance data relating to the signature as will be described more fully below. Furthermore the term "reference signature" is used to denote an electronic representation of a hypothetical authentic signature to which the inputted signature is to be compared, this hypothetical authentic signature comprising data constituting an abstraction of the actual signature extracted from a number of samples of the actual signature and possibly varying with time as further examples of the actual signature are sampled.

It should also be appreciated that the term "authentication system" is to be interpreted as including within its scope not only systems for verifying a user's signature, for example for providing access to a bank account, but also systems for identifying individuals based on an input signature, for example in airport security. This identification is accomplished by comparing the input signature with stored reference signatures for a match above a degree of confidence.

In order that the invention may be more fully understood, reference will now be made, by way of example, to the accompanying drawings, in which.

The following description is given with reference to a preferred authentication system in accordance with the invention which has been shown in trials to give both a low false accept rate (FAR) and a low false reject rate (FRR). However it will be appreciated that many variations in such a system are possible within the scope of the invention, and that the choice of particular parameters, sample rates and verification procedures will depend on the particular application to which the system is to be applied. Furthermore the description of the system will be given with reference to accessing of the system over the Internet by a user making use of a mouse and keyboard connected to a personal computer (PC). Of course, other types of input device, such as a stylus tablet, can be used with systems in accordance with the invention, and such systems can be applied to any application in which signature authentication is required and are not simply limited to internet access applications.

The description of the system given below will be divided into a description of the manner in which the system authenticates a user, a description of the manner in which the user initially registers on the system, and a description of the manner in which the system is trained.

Authentication

A key feature of the preferred authentication system in accordance with the invention is the ability to match parameters of a signature inputted by the user into the system using the mouse with the corresponding parameters of a reference signature held within the system. Spatial co-ordinates are extracted by the system from the inputted user signature, as shown at A in FIG. 1 for example, to obtain a signature trace as shown at B in FIG. 1, each spatial co-ordinate being accompanied by a temporal value. This signature trace is then normalised such that it contains say 100 temporally equidistant points using linear time warping. The signature is normalized so that its arc length is 1 and so that the total time taken to produce the signature is 1.

From the normalised signature trace the system extracts say 10 relative angle parameters (an angle between vectors to two points) and say 10 relative distance parameters (a Euclidean distance between two points). In order to extract points that provide a high between-class variance and low within-class variance (i.e. so that the features are as unique as possible) the system uses a genetic algorithm (GA) to extract these features from the normalized signature. The GA is evolved using standard crossover, mutation and selection, and can be defined using the following relationships.

The Euclidean distance, $D_{ij}$, between two points $S_i=(x_i,y_i)$ and $S_j=(x_j,y_j)$, where $(0 \leq i<j<N') \lor (i=N'-1, j=0)$, in a linearly time warped signature containing N' points is given by:

$$D_{ij} = \sqrt{(x_j-x_i)^2 + (y_j-y_i)^2} \qquad \text{(Eq. 1)}$$

Figure 1:
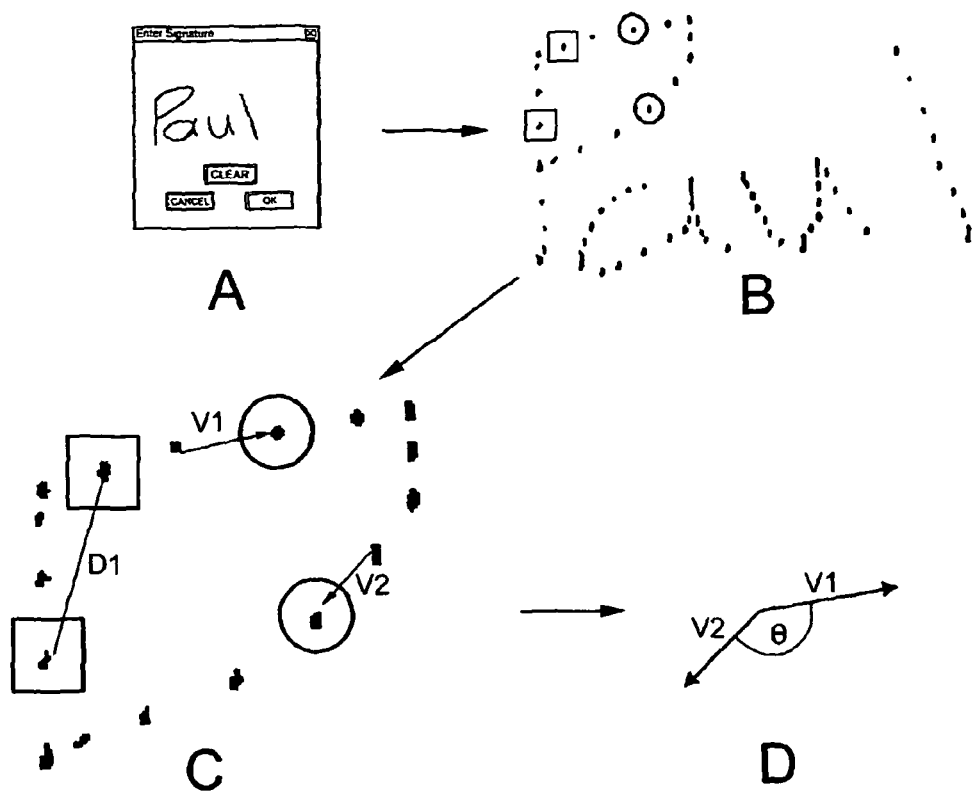
FIG. 1 is a diagram showing success steps in extraction of angle and distance data in relation to a user's signature in a system according to the invention.

An example of such a distance D1 between two points in the trace is shown at C in FIG. 1.

The vector associated with a point, $S_i$, is obtained by the function $V(S_i)$, which returns either a vector from the previous point to the current point, or from the last point to the first point in the trace.

$$V(S_i) = \overline{S_i - S_{i-1}}, \text{ if } i>0$$

$$V(S_i) = \overline{S_i - S_{N'-1}}, \text{ otherwise} \qquad \text{(Eq. 1)}$$

where $\overline{S}$ indicates vector normalisation. Two such vectors V1 and V2 are shown at C in FIG. 1 by way of example.

The angle, $A_{ij}$, from $S_i$ to $S_j$ where $(0 \leq i<j<N') \lor (i=N'-1, j=0)$, is obtained from the function $\zeta$, which returns the clockwise angle between the two vectors (as shown at D in FIG. 1 for the vectors V1 and V2):

$$A_{ij} = \zeta(V(S_i), V(S_j)) \qquad \text{(Eq. 3)}$$

where $V(S_x)$ is defined by Equation 2.

The fitness for a pair of points (i.e. a single gene) is given by:

$$\text{fitness}(G) = \qquad \text{(Eq. 4)}$$

$$\sqrt{\left(n\sum_{k=0}^{n} f(x_k)^2 - \left(\sum_{k=0}^{n} F(x_k)\right)^2\right)/n(n-1)} - (|j-i|/N')$$

where G is a gene containing the reference number of two points in the signature, that is $G=(S_i, S_j)$ for signature point i and signature point j, and where n is the number of signatures input by a specific user during registration and $f(x_k)$ is a function that calculates either the angle ($A_{ij}$) or distance ($D_{ij}$) between the points $S_i$ and $S_j$.

The fitness for the set of features (i.e. the chromosome) is given by:

$$CF = \sum_{i=1}^{g} \text{fitness}(G_i)/g + \alpha + \beta + \chi \qquad \text{(Eq. 5)}$$

where g is the number of genes in the population and fitness ($G_i$) is defined by Equation 4. The function $\alpha$ penalises chromosome fitness in proportion to the fitness of the worst gene, using the function (Min(1.0−standard deviation ($G_{0 \ldots i}$))). To ensure that relationships are well distributed the signature is divided into g sections, as shown in FIG. 1 at B. The function $\beta$ then returns a bonus for each section containing a from point ($S_i$ in $G=(S_i, S_j)$) and the function $\chi$ returns a bonus for each section containing a to point ($S_j$ in $G=(S_i, S_j)$).

Figure 2:
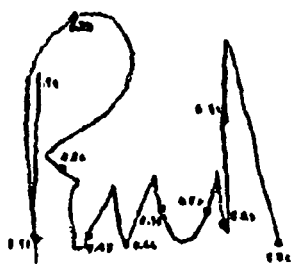
FIG. 2 is a diagram representing splitting of a user's signature for the purposes of data extraction.
Figure 3:
FIGS. 3 and 4 are diagrams contrasting the data relationships obtained with the splitting of a user's signature in accordance with FIG. 2 and according to a ranking approach.
Figure 4:
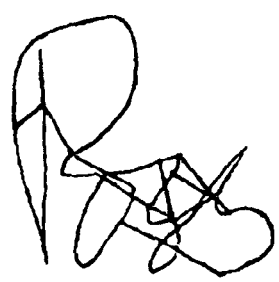

The parameters that are extracted by the system from the signature are illustrated in FIG. 1, and examples of relationships that are identified by these parameters are shown in FIGS. 2, 3 and 4. Although the GA usage is considered important it may be possible to extract the angle and distance relationships using other techniques. It is the obtaining of these angle and distance relationships such that they are sufficiently unique that is the most important criterion to obtain the required accuracy of authentication.

The set of angle values and the set of distance values extracted for a particular user are used to represent their signature. To this end the system incorporates two neural networks, each containing ten input nodes, that is one network for the 10 angle parameters and one network for the 10 distance parameters.

Figure 5:
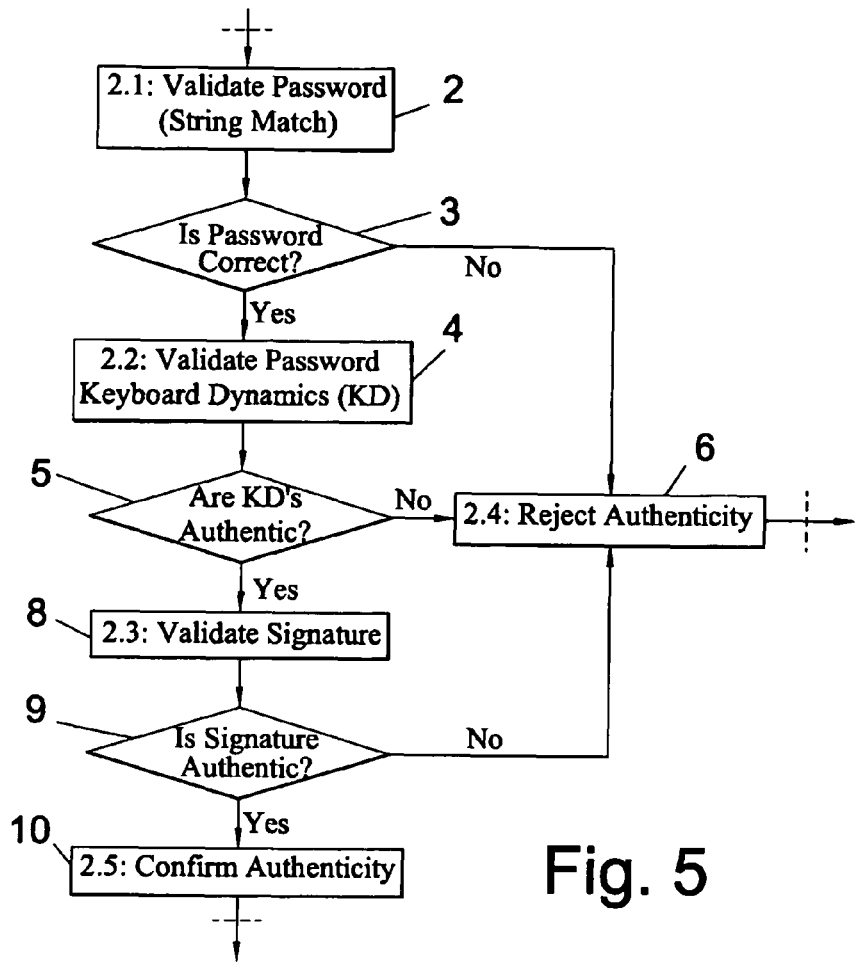
FIG. 5 is a flow diagram illustrating password and signature authentication in the system according to the invention.

Referring to the flow diagram of FIG. 5, in use of the system to authenticate a user's signature the user must enter their user name into the system by means of the keyboard to identify themselves to the system. The user's template file is retrieved by the system in response to entry of the user name, this template file having been previously encrypted using a standard encryption algorithm during compilation of the template file as will be described below. The user must then enter their password. During this password entry the system records timing information in addition to the password string. Password verification is provided in a two-stage process, firstly by a string match step indicated at 2 and secondly by a keyboard dynamics (KD) verification step shown at 4 in FIG. 5. In the event of a match between the inputted word and the password in the user's template file, logic 3 initiates the KD verification step at 4, whereas, in the event of such a match not being found, the logic 3 initiates a reject indication in a reject authentication step 6. Where a match is found the timing with which the password was entered by the user on the keyboard is then verified in the KD verification step shown at 4. In the event of a match between the inputted KD and the KD in the user's template file, logic 5 enables signature validation at 8, whereas, in the event of such a match not being found, the logic 5 initiates a reject indication in the reject authentication step 6. In this regard it should be noted that, even if a string match or KD match is not found, the user must still enter the signature. A reject message is then provided at the end of the input sequence so that an imposter is not able to determine what particular part of the input sequence has resulted in such rejection.

The user must then enter their signature by appropriately manipulating the mouse to initiate signature validation at 8 in FIG. 5. Both spatial and temporal information in relation to inputting of the signature must be gathered for the system to function correctly, though this may not be the case if specialised hardware is used that provides equidistant timing samples (in which case the timing values will therefore be implicitly provided after normalisation). In the event of a match between the inputted signature trace and the reference signature trace in the user's template file, logic 9 initiates authenticity confirmation at 10, whereas, in the event of such a match not being found, the logic 9 initiates a reject indication in the reject authentication step 6.

Authenticity is verified provided that the user passes all three tests (string match, keyboard dynamics match and signature match). Below is a brief description of how the system verifies each of the tests. A simple string match is used to ensure that the password entered is the same as that supplied by the authentic user. From the user password input hold and latency time values and the total time are extracted. The hold times represent the length of time each key is held down, and the latency times indicate the time from releasing of one key until pressing of the next key, with the total time being the time taken from pressing of the first key until releasing of the last key. Before being fed into a neural network the hold and latency times are normalised by the total time, that is each hold and latency value is divided by the total time to type the password. The input node size for the password neural network is therefore (number of hold times+number of latency times) and the actual inputs are the normalised hold and latency times. Each of the neural networks has a single output node that should output 0 if the user is identified as a forger and 1 if the user is authenticated.

It is feasible that different normalisation techniques could be used and more than one neural network used (one for hold and one for latency times for example). The important point is that the keyboard dynamics of the password input is used. Also different normalisation and pre-processing steps could be applied to the signature trace.

Registration

The neural network based system functions in three distinct modes, that is registration, training and authentication. During the registration phase new users are required to select a user name and input a chosen password and signature multiple times. The gathered biometric data is processed to extract salient information, with techniques including the use of a genetic algorithm. The details of the salient information used are then stored in a template file. During the training phase a novel technique is used to automatically generate forged samples. These forged samples, together with the authentic user samples, are provided to a back-propagation neural network, which is trained and stored upon the server. During authentication the user logs into the system via an applet that accepts a username, password and signature. The user template file, retrieved from the server, contains details of the salient features for the authentic user, which are then extracted from the input biometric data and sent to the server for verification. The data between client and server may be communicated safely because information is not transmitted from which a signature could be reconstructed. Eavesdroppers may, therefore, intercept all transfers without compromising system integrity.

No two signatures are identical, even when signed by the same person. The lengths of the signature trace (in terms of the number of sampled points), the spatial size and temporal information will all vary. These differences are exaggerated by this system because input noise caused by variances in the provided sampling rate will distort the input signature data. The input signature trace therefore needs to be pre-processed to reduce the effect of these differences and to convert the trace into a standard format. Signature traces are pre-processed to normalise the arc length (signatures with disjoint segments are joined by the system to produce a single continuous arc). Next, the total time taken to produce the trace is normalised. Finally, the traces are linearly time warped to contain a pre-determined number of temporally equidistant points, typically 100, using the process described by L. Lee, "Neural Approaches for Human Signature Verification", Proc. 3rd International Conference Document Analysis and Machine Intelligence (TPAMI), vol. 15, No. 9. 1993, pp. 953-957.

It is possible to represent a signature using all information obtainable from the raw signature trace in a similar way to the keyboard dynamics' data. This is, however, undesirable because, due to the abundance of available information, much of the data will not provide a significant degree of uniqueness or consistency and the usage of such information could, therefore, prove to be counter-productive. Storing all of the information is also costly (in terms of space) and has implications for processing overheads when training networks and verifying signatures. Fortunately, it is possible to represent a signature by a number of extracted features rather than using all of the raw data. To this end the system uses an adaptation of a technique disclosed in Ozcan, E and Mohan, C (1996), "Shape Recognition Using Genetic Algorithms", Proceedings of the IEEE International Conference on Evolutionary Computation, Nagoya (Japan) May 1996, pp. 414-420, and Ozcan, E and Mohan, C (1998), "Steady State Memetic Algorithm For Partial Shape Matching", Proceedings of the IEEE 7th Annual Conference on Evolutionary Programming, March 1998, to perform partial spatial shape matching, where relative angle and distance relationships between shape (signature) points are used. Equations 1 to 3 above define these relationships.

To use the extracted angle and distance information to characterise a signature trace a technique must be implemented to obtain both the salient angle and distance relationships from any input signature. To do this the technique must obtain an adequate set of points from the signature, from which relationships are extracted. This is performed with the intention of minimising within-class variance and maximising between-class variance, where within-class variance is the degree to which patterns belonging to the same class (user) differ and between-class variance is the degree to which patterns belonging to different classes differ.

If users are required to access the system upon an uncontrolled network, such as the Internet, then standard encryption techniques should be used to encode data transmissions. During most data transfers the data sent cannot be used to reconstruct a user signature as the only sufficiently unique relationships identified by the Genetic Algorithm (GA) are used. For example, only the values pertaining to the 10 angle and 10 distance parameters need be sent and it is not possible for the whole signature to be reconstructed from these parameters alone. The most dangerous time therefore is when registration data is being sent to a remote server prior to feature extraction (using the GA) and storage. This problem could be avoided either by providing a secure location for registration or by extracting the angle and distance parameters upon the local machine (although this may take some time).

Figure 7:
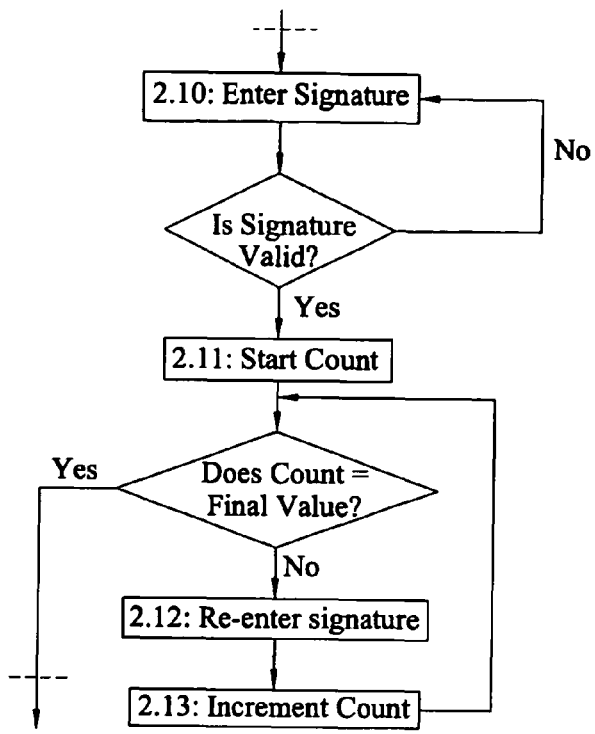
FIGS. 7 and 8 are flow diagrams illustrating signature and password registration in the system according to the invention.
Figure 8:
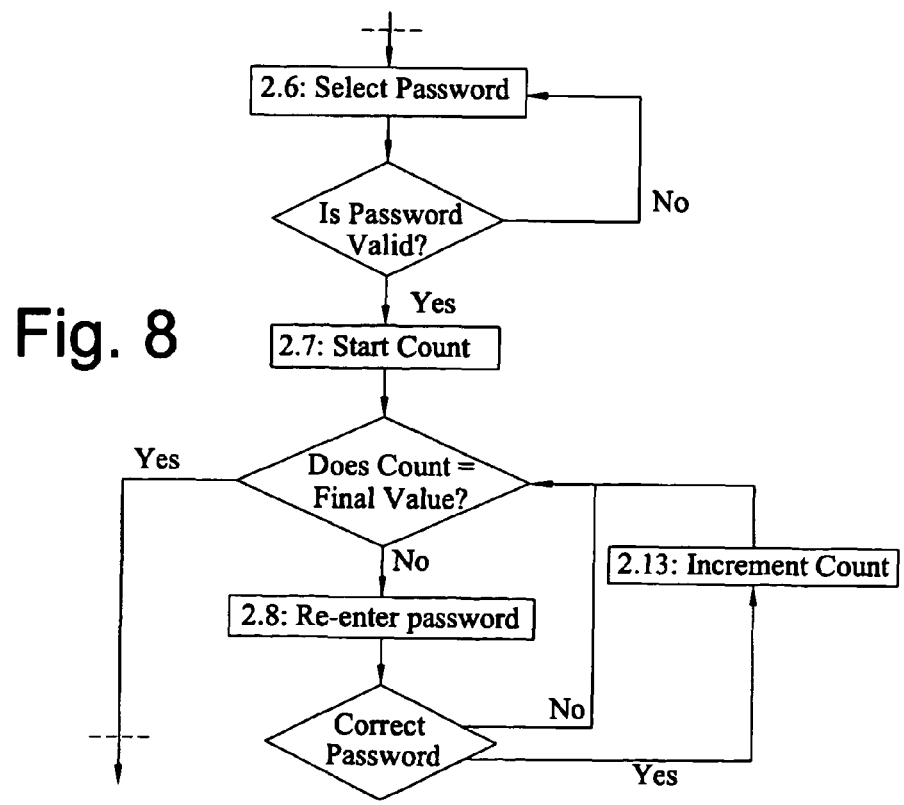

During registration the user must choose a username that is available and appropriate. The user must then enter a password and signature multiple times so that the data may be used for the system to generalise. FIG. 8 is a flow diagram indicating the validation and multiple inputting of the password, and the process by which the number of valid entries of the password is counted to arrive at a final count value after which the registration proceeds to the next stage. FIG. 7 is a flow diagram indicating the validation and multiple inputting of the user's signature, and the process by which the number of valid entries of the signature is counted to arrive at a final count value after which the registration proceeds to the next stage. A user template file is stored by the system containing the data gathered during the registration process. The spatial and temporal data obtained is used to train the neural networks for authentication purposes. Neural networks are used for authentication during the login phase.

Salient information to be used to identify a user is extracted from the data stored in the user's template file, and training data is created using the salient information extracted from the user's registration data in order to train the neural networks.

Training

Because the biometric information used in this system is liable to change with time (writing and typing styles change) the system must be able to adapt. This adaptation can be provided by performing periodic retraining of the entire system using data accumulated from successful logins. Alternatively data could be presented to the trained networks at each successful login, from which an output error is calculated. A single back-propagation pass is then performed, allowing gradual evolution of the networks.

Any neural network based verification system must contend with the issue of obtaining large amounts of training data needed to ensure a good ability to generalise. The authentic user may provide positive samples at the registration phase. However there are two main problems associated with obtaining false password and signature data from real people. Firstly the authentic user's password and signature must be made available to such people and secondly people willing to provide a sufficient number of good quality forged samples must be found. For these reasons a challenge for designing the system was to determine a technique for auto-generating a sufficient number of useful false data samples to allow effective neural network training to take place.

The biometric data obtained from user input can be considered as residing in a small sub-space of a much larger space. It is possible to authenticate an individual based upon whether their input data falls within this profile space region, but the difficulty for any system is determining the appropriate size and shape of the authentic user's profile space. In this system the mean and standard deviation extracted from the data supplied at the time of registration (hold/latency times or angle/distance relationships) are used to provide an approximate model of the profile space. In each plane of dimensionality the mean values provide the centre of the profile space whilst the radii are based upon the standard deviation values. Other values such as the mean deviation could be used in the authentication process.

When using any verification technique it is evident that the most difficult forgeries to recognise are those that are very similar to authentic samples, lying close to the authentic user's profile space. Forgeries which reside further from the profile space can more easily be rejected by a verification system and therefore need fewer training sets with which the system can learn. To determine an optimal solution to the verification problem mainly false samples that lie close to the profile space boundaries within a boundary space region are used to train the system, with a few outlying samples to ensure correct modelling of the problem domain. The boundary space region is an enclosing sub-space whose radius is the same as the profile space radius (in each plane of dimensionality) and is set at a distance 0.25 times the radius.

To generate meaningful false samples for neural network training values must be generated that lie within the boundary space region. These false samples are generated using pseudo-random values for each axis, based upon the authentic user's characteristic patterns (additional true samples are generated within the profile space). Using this technique difficult forgeries are generated because they often lie outside the profile space in only one plane of dimensionality.

To perform verification the system uses three neural networks for each user trained using the back-propagation algorithm as disclosed in Bishop, C. "Neural Networks for Pattern Recognition", Oxford University Press, 1995. The first network uses hold and latency times to test typing style, and the second and third networks use angle and distance information to test the input signature. Separate angle and distance networks are preferably used because a combined network may be unable to correctly model the problem domain. The networks are trained using the authentic user data input at the time of registration and automatically generated false and true samples using the technique described in the previous section.

When performing gradient descent on the networks it is possible to over-fit a problem such that the network remembers the input patterns rather than establishing an ability to generalise. The global minima of an error surface may provide a bad solution here because the input patterns are remembered. In order to combat this problem the system uses a validation set during training to test for an ability to generalise. Gradient descent is performed with respect to the training set but the previously unseen validation set is used to test for generalisation ability. To create the training, validation and testing sets the authentic user data (and auto-generated true data) is split between the three sets. False data is generated for each using boundary space generation, with the validation and testing sets using a boundary space slightly closer to the profile space than the training set so that performance and ability to generalise is assessed based upon more difficult samples.

Figure 9:
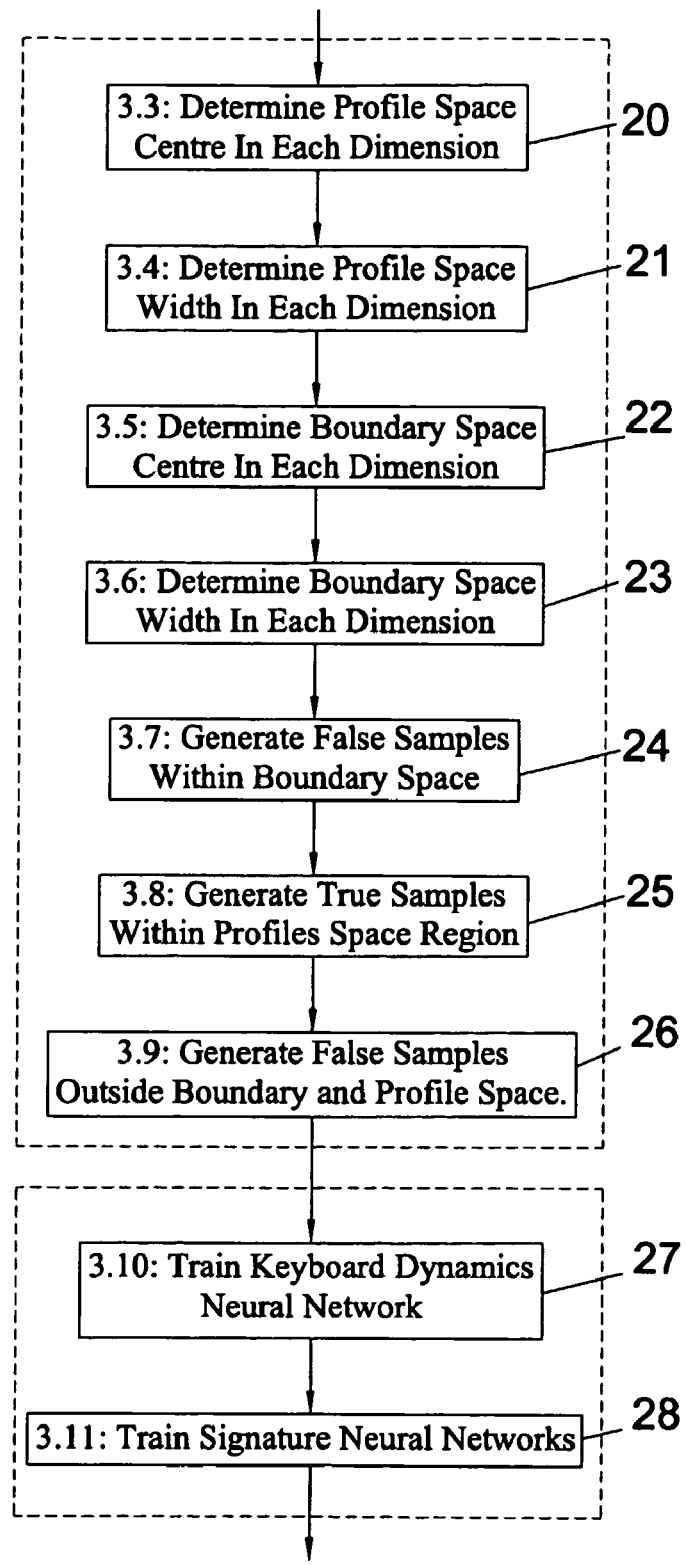
FIG. 9 is a flow diagram of training used in the system according to the invention.

FIG. 9 is a flow chart showing the required training steps. Initially features are extracted from the keyboard dynamics of password input and further features are extracted from the user signature input. At 20 the centre in each dimension of the profile space region within which user true samples are expected to lie is identified, and at 21 the width in each dimension of the profile space region is identified. The region is based upon the mean and standard deviation values of the extracted salient data. This region could also be calculated using metrics other than mean and standard deviation.

At 22 the centre in each dimension of the boundary space region within which user true samples are expected to lie is identified, and at 23 the width in each dimension of the boundary space region is identified. The region is based upon the mean and standard deviation values of the extracted salient data. This region could also be calculated using metrics other than mean and standard deviation.

At 24 and 25 false and true training samples are generated within the boundary and profile space regions respectively and added to the authentic user data. Furthermore false samples are generated outside the boundary and profile regions at 26. This data is then used for training, validation and testing data. The proportion of each data type in each of the training sets may be altered (including the use of zero authentic samples in the testing set for example). At 27 a neural network is trained using the keyboard dynamics data. In this case the hold and latency times are used after normalisation, but the exact data used could be varied, i.e. hold times only or latency times only. Also separate neural networks could be trained for the hold times and for the latency times. At 28 neural networks are trained using the signature data. More particularly two neural networks are trained to verify angle and distance relationships within a signature. For authenticity to be confirmed both of these networks must confirm authenticity.

Figure 6:
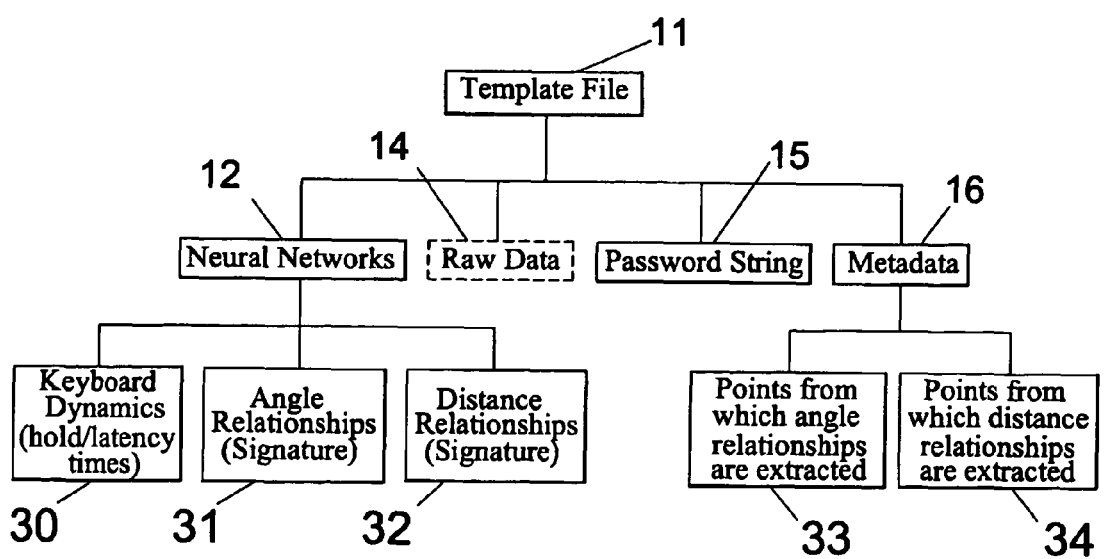
FIG. 6 is a block diagram of the system according to the invention.

FIG. 6 shows a preferred implementation of the template file 11 on the server consisting of neural networks 12, raw data 14, the password string 15 and the metadata 16. As previously indicated the neural networks 12 incorporate keyboard dynamics data 30 (hold/latency times), signature angle relationship data 31 and signature distance relationship data 32. Furthermore the metadata 16 incorporates points 33 from which the angle relationships are extracted and points 34 from which the distance relationships are extracted The dotted box indicates that the raw data 14 will only be communicated to the server during registration and then will not be accessible. This data does not have to be communicated at all if the user registers at a secure location or if the GA extracts feature points on the client machine and then sends only the relevant data and metadata to the server. The other boxes show the data that may be communicated between the client and the server, although in an ideal situation only the metadata 16 needs to be sent to the client at login. The client would then extract the appropriate features and send these back to the server, with the result that the authentic signature could not be reconstructed from the transmitted messages.

It is a particular advantage of such a system that it uses a hybrid approach to verification, requiring an authenticity confirmation from both a typing style test and a signature match. The first stage of the system verifies authenticity based upon typing style, with biometric information obtained from keyboard dynamics of the user's password input. Using the password input as the source of biometric data means the security benefits of standard password verification are enhanced, whilst no increase is placed upon the user's cognitive load. The second stage of the system verifies authenticity based upon an on-line signature match that uses temporal and spatial information. Unlike other systems which have been proposed in the past the system uses the mouse as the input device. Two existing user skills are therefore built upon; mouse use and signature writing. Although a pen-based system could be more desirable in terms of ease-of-use, this would mean that it would no longer be possible to access the system via the Internet using no specialised hardware.

Furthermore, by using passwords and signatures to gather biometric data, it is possible to avoid negative social stigmas, such as may be encountered, for example, in use of fingerprint systems. In a study conducted with 35 participants it was determined that 83% of people are happy to provide signatures as a means of verification, and of these 97% would be happy to provide their signature for use on the Internet.

The invention claimed is:

1. A system comprising:
   first extraction means for extracting first angle data and first distance data relating to different parts of a user's signature to obtain a signature trace;
   normalization means for generating a normalized signature trace by determining a plurality of temporally equidistant points on the signature trace, wherein an arc length of the signature trace is a unit measurement of length and a total time to produce the signature trace is a unit measurement of time;
   second extraction means for extracting second angle data and second distance data relating to different parts of the normalized signature trace, wherein the second angle data and second distance data are selected such that variance between signatures from the user is minimized and variance between signatures from other users is maximized;
   registration means for storing a reference data file comprising reference angle data and reference distance data extracted from a plurality of samples of a user's signature;
   comparison means for comparing the data extracted by the second extraction means during an authentication phase to the reference angle data and the reference distance data stored in the reference data file, according to predefined verification criteria; and
   verification means for generating an output indicative of a match between the user's signature and the reference angle data and the reference distance data in dependence on said comparing,
   wherein the second extraction means is implemented in a computing device.

2. The system according to claim 1, wherein the second extraction means is adapted to extract data relating to a plurality of different points of the user's signature including data relating some of said points to other points in the user's signature.

3. The system according to claim 2, wherein the second extraction means is further adapted to extract data relating to a plurality of different points of the user's signature including data relating a number of said points to an immediately preceding point in the user's signature.

4. The system according to claim 2, wherein the second extraction means is further adapted to extract data relating to a plurality of different points of the user's signature including data relating a last point to a first point in the user's signature.

5. The system according to claim 1, wherein the second extraction means includes angle extraction means for extracting angle data concerning relative angular positions of a plurality of points of the user's signature.

6. The system according to claim 1, wherein the second extraction means includes distance extraction means for extracting distance data concerning relative distances apart of a plurality of points of the user's signature.

7. The system according to claim 1, wherein the second extraction means includes timing extraction means for extracting timing data indicative of relative times between execution of different parts of the user's signature, and the comparison means is adapted to compare extracted timing data with reference timing data in the reference data file.

8. The system according to claim 1, further comprising password verification means for verifying a user password.

9. The system according to claim 8, further comprising timing verification means for verifying that the user password is input in accordance with a predetermined timing.

10. The system according to claim 9, wherein the timing verification means includes means for verifying a plurality of hold times for which relevant keys of a keyboard input device are depressed during input of the user password, and means for verifying a plurality of latency times between a release of one key and a depression of a following key during use of the keyboard input device to enter the user password.

11. The system according to claim 1, further comprising user name input means for receiving a user name.

12. The system according to claim 1, wherein the comparison means incorporates at least one neural network for determining the predefined verification criteria.

13. The system according to claim 1, wherein the second extraction means is adapted to extract data relating to different features of the user's signature selected according to a fitness of such features to discriminate the user's signature for purposes of verification and determined by a fitness function relating a relative fitness of the features to their form and number.

14. The system according to claim 13, wherein the fitness function is optimized by an optimization algorithm.

15. The system according to claim 1, further comprising training means for training the system to refine the predefined verification criteria using angle and distance data relating to a plurality of samples of the user's signature inputted into the system by the user during a registration phase and generated false samples.

16. The system according to claim 1, wherein the verification means is adapted to provide an output indicative of a non-match.

17. The system of claim 1, wherein the first extraction means is adapted to extract at least one vector to derive the angle data and distance data.

18. The system according to claim 1, wherein the second extraction means is adapted to extract data according to a fitness determined by applying a genetic algorithm to pairs of said temporally equidistant points.

19. A method comprising:
  extracting, by a computing device, first angle data and first distance data relating to different parts of a user's signature inputted into the system by a manual input device to obtain a signature trace;
  normalizing, by the computing device, the signature trace to generate a plurality of temporally equidistant points on the signature trace, wherein an arc length of the signature trace is a unit measurement of length and a total time to produce the signature trace is a unit measurement of time;
  extracting, by the computing device, second angle data and second distance data relating to different parts of the normalized signature trace, wherein the second angle data and second distance data are selected such that variance between signatures from a user is minimized and variance between signatures from other users is maximized;
  creating a reference data file comprising reference angle data and reference distance data extracted from a plurality of samples of the user's signature;
  comparing, by the computing device, data relating to different parts of the normalized signature trace during an authentication phase to the reference angle and the reference distance data stored in the reference data file, according to predefined verification criteria; and
  generating an output indicative of a match between the user's signature and the reference angle data and reference distance data in dependence on said comparing.

20. The method of claim 19, wherein said extracting said first angle data and first distance data comprises extracting data relating to a plurality of different points of the user's signature including data relating some of said points to other points in the user's signature.

21. The method of claim 20, wherein said extracting said first angle data and first distance data comprises extracting data relating to a plurality of different points of the user's signature including data relating a number of said points to an immediately preceding point in the user's signature.

22. The method according to claim 20, wherein extracting said first angle data and first distance data comprises extracting data relating to a plurality of different points of the user's signature including data relating a last point to a first point in the user's signature.

23. The method of claim 19, wherein extracting said first angle data and first distance data includes extracting angle data concerning relative angular positions of a plurality of points of the user's signature.

24. The method of claim 19, wherein extracting said first angle data and first distance data includes extracting distance data concerning relative distances apart of a plurality of points of the user's signature.

25. The method of claim 19, wherein extracting said first angle data and first distance data includes extracting timing data indicative of relative times between execution of different parts of the user's signature, and said comparing further comprises comparing extracted timing data with reference timing data in the reference data file.

26. The method of claim 19, further comprising verifying a password input.

27. The method of claim 26, further comprising verifying the password using a predefined timing.

28. The method of claim 27, wherein verifying the password input further comprises:
  verifying a plurality of hold times for which relevant keys of a keyboard input device are depressed during input of the password; and
  verifying a plurality of latency times between a release of one key and a depression of a following key during use of the keyboard input device to enter the password.

29. The method of claim 19, further comprising receiving a user name and using the user name to identify a reference data file.

30. The method of claim 19, wherein said comparing the angle and distance data incorporates at least one neural network for determining the predetermined verification criteria.

31. The method of claim 19, wherein said extracting said first angle data and said first distance data further comprises extracting data relating to different features of the user's signature selected according to a fitness of such features to discriminate the user's signature for purposes of verification and determined by a fitness function relating a relative fitness of the features to their form and number.

32. The method of claim 31, wherein the fitness function is optimized by an optimization algorithm.

33. The method of claim 19, further comprising training to refine the predefined verification criteria on a basis of angle and distance data relating to a plurality of samples of the user's signature inputted by the user during a registration phase and generated false samples.

34. The method of claim 19, wherein said generating further comprises generating an output indicative of a non-match.

35. A non-transitory computer-readable storage medium having instructions stored thereon, the instructions comprising:
  instructions for extracting first angle data and first distance data relating to different parts of a user's signature to obtain a signature trace;
  instructions for normalizing the signature trace to generate a plurality of temporally equidistant points on the signature trace, wherein an arc length of the signature trace is a unit measurement of length and a total time to produce the signature trace is a unit measurement of time;
  instructions for extracting second angle data and second distance data relating to different parts of a normalized signature trace, wherein the second angle data and second distance data are selected such that variance between signatures from a user is minimized and variance between signatures from other users is maximized;

instructions for storing a reference data file comprising reference angle data and reference distance data extracted from a plurality of samples of the user's signature;

instructions for comparing data relating to different parts of the normalized signature trace during an authentication phase to the reference angle and the reference distance data stored in the reference data file, according to predefined verification criteria; and instructions for generating an output indicative of a match between the user's signature and the reference angle data and reference distance data in dependence on comparing.

36. The non-transitory computer-readable storage medium of claim 35,
wherein the plurality of samples of the user's signature are normalized based, at least, upon a time to obtain a plurality of normalized samples.

37. The non-transitory computer-readable storage medium of claim 36, further comprising:
instructions for training to refine the predefined verification criteria by which a match is to be judged on a basis of angle and distance data relating to a plurality of samples of the user's signature during a registration phase and generated false samples.

38. A system comprising:
an input apparatus configured to provide an output indicative of a location of the input apparatus when the input apparatus is manipulated;
a computing apparatus configured to:
extract first angle data and first distance data relating to different parts of a user's signature output by the input apparatus to obtain a signature trace;
normalize the signature trace to generate a plurality of temporally equidistant points on the signature trace, wherein an arc length of the signature trace is a unit measurement of length and a total time to produce the signature trace is a unit measurement of time;
extract second angle data and second distance data relating to different parts of the normalized signature trace, wherein the second angle data and the second distance data are selected such that variance between signatures from a user is minimized and variance between signatures from other users is maximized; and
store a reference data file comprising reference angle data and reference distance data relating to a plurality of samples of the user's signature, wherein the plurality of samples of the user's signature are normalized based upon a time to obtain a plurality of normalized samples;
a comparator apparatus configured to compare data relating to different parts of a normalized signature trace during an authentication phase to the reference angle and the reference distance data held in the reference data file, according to predefined verification criteria; and
an output apparatus configured to provide an output indicative of a match between the user's signature and the reference angle data and reference distance data in dependence on a result of the comparison.

39. The system of claim 38, wherein the plurality of samples of the user's signature are normalized based, at least, upon a time to obtain a plurality of normalized samples.

40. The system of claim 39, further comprising:

a trainer configured to refine the predefined verification criteria by which a match is to be judged on a basis of angle and distance data relating to a plurality of samples of the user's signature during a registration phase and generated false samples.

41. A method comprising:
comparing, by a computing device, data derived from at least one vector from an input signature received from a manual input device during an authentication phase to reference angle data and reference distance data, according to predefined verification criteria, wherein the data derived from said at least one vector comprises data relating to different parts of a normalized signature trace, wherein an arc length and total time of a signature trace are normalized to unit measurements to generate a plurality of temporally equidistant points on the signature trace, wherein the reference angle data and reference distance data is obtained from a reference data file comprising data relating to a plurality of samples of the user's signature, wherein the plurality of samples of the user's signature are normalized based upon a time to obtain a plurality of normalized samples and selected such that variance between signatures from a user is minimized and variance between signatures from other users is maximized; and
generating an output indicative of a match between the data derived from said at least one vector and the reference angle data and reference distance data.

42. The method of claim 41, wherein the data derived from said least one vector relates to different features of the user's signature selected according to a fitness of such features to discriminate the user's signature for purposes of verification and determined by a fitness function relating relative fitness of the features to their form and number.

43. The method of claim 42, wherein the fitness function is optimized by an optimization algorithm.

44. The method of claim 41, further comprising:
training to refine the predefined verification criteria by which said match is to determined.

45. The method of claim 41, further comprising verifying an input of a required password, as determined by a reference password.

46. The method of claim 45, further comprising verifying the input of the required password with a required timing, as determined by a reference timing.

47. The method of claim 46, wherein verifying the input further comprises:
verifying a plurality of hold times for which relevant keys of an input device are depressed during input of the required password; and
verifying a plurality of latency times between a release of one key and a depression of a following key during use of the input device to enter the required password.

48. A method comprising:
receiving, from a manual input device, a signature;
extracting, by a computing device, first angle data and first distance data relating to different parts of the signature to obtain a signature trace;
normalizing, by the computing device, the signature trace to generate a plurality of temporally equidistant points on the signature trace, wherein an arc length of the signature trace is a unit measurement of length and a total time to produce the signature trace is a unit measurement of time;
extracting, by the computing device, second angle data and second distance data relating to different parts of the normalized signature trace, wherein the second angle data and second distance data are selected such that variance between signatures from a user is minimized and variance between signatures from different users is maximized;

storing a reference data file comprising reference angle data and reference distance data extracted from a plurality of samples of a user's signature input during a registration phase;

comparing, by the computing device, data relating to different parts of a normalized signature trace during an authentication phase to the reference angle data and the reference distance data stored in the reference data file, according to defined verification criteria; and providing an output indicative of a match between the user's signature and the reference angle data and reference distance data in dependence on a result of said comparing.

49. The method of claim 48, further comprising linearly time warping the signature trace, wherein the normalized signature trace contains a pre-determined number of temporally equidistant points.

* * * * *

UNITED STATES PATENT AND TRADEMARK OFFICE
CERTIFICATE OF CORRECTION

| | | |
|---|---|---|
| PATENT NO. | : 7,869,634 B2 | Page 1 of 1 |
| APPLICATION NO. | : 10/500854 | |
| DATED | : January 11, 2011 | |
| INVENTOR(S) | : McOwan et al. | |

It is certified that error appears in the above-identified patent and that said Letters Patent is hereby corrected as shown below:

Column 14, line 39, in Claim 44, delete "is to" and insert -- is to be --.

Signed and Sealed this
Nineteenth Day of July, 2011

David J. Kappos
*Director of the United States Patent and Trademark Office*